(12) United States Patent
Hui et al.

(10) Patent No.: US 9,245,665 B2
(45) Date of Patent: Jan. 26, 2016

(54) CONDUCTIVE METAL COMPOSITION

(71) Applicant: E I DU PONT DE NEMOURS AND COMPANY, Wilmington, DE (US)

(72) Inventors: Dave Hui, Bristol (GB); John D Summers, Chapel Hill, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 13 days.

(21) Appl. No.: 14/105,359

(22) Filed: Dec. 13, 2013

(65) Prior Publication Data

US 2014/0170334 A1   Jun. 19, 2014

Related U.S. Application Data

(60) Provisional application No. 61/737,205, filed on Dec. 14, 2012.

(51) Int. Cl.
*H01B 1/22* (2006.01)
*B05D 5/12* (2006.01)
*H01B 13/00* (2006.01)
*C08K 3/08* (2006.01)

(52) U.S. Cl.
CPC .. *H01B 1/22* (2013.01); *B05D 5/12* (2013.01); *C08K 3/08* (2013.01); *H01B 13/003* (2013.01)

(58) Field of Classification Search
CPC .............. H01B 1/00; H01B 1/16; H01B 1/22; C08K 3/08; C09D 5/24; C09D 11/324; C09D 11/52; B05D 5/12
See application file for complete search history.

(56) References Cited

U.S. PATENT DOCUMENTS

| | | | |
|---|---|---|---|
| 5,286,415 A | 2/1994 | Buckley et al. | |
| 6,712,997 B2 * | 3/2004 | Won et al. | 252/503 |
| 7,491,262 B2 * | 2/2009 | Kang et al. | 96/11 |
| 8,246,155 B2 * | 8/2012 | Rengaswamy et al. | 347/98 |
| 2002/0145132 A1 | 10/2002 | Won et al. | |

FOREIGN PATENT DOCUMENTS

| CN | 102277109 A | 12/2011 |
|---|---|---|
| EP | 1 743 691 A1 | 1/2007 |

OTHER PUBLICATIONS

EL1123WOPCT Search Report, dated Apr. 7, 2014.

\* cited by examiner

*Primary Examiner* — Mark Kopec

(57) ABSTRACT

A conductive metal composition comprising 40 to 88 wt % of silver particles having an average particle size in the range of 10 to 100 nm and having an aspect ratio of 3 to 1:1, 2 to 20 wt % of a poly(2-ethyl-2-oxazoline) resin having a weight-average molar mass of 50,000 to 500,000 and 10 to 58 wt % of a solvent for the poly(2-ethyl-2-oxazoline) resin.

14 Claims, No Drawings

CONDUCTIVE METAL COMPOSITION

FIELD OF THE INVENTION

The present invention is directed to a conductive metal composition.

BACKGROUND OF THE INVENTION

CN 102277109 discloses a conductive silver paste which can be cured by photonic sintering (light cured). The silver paste comprises flaky silver powder, organic resin (polyacrylic add resin or epoxy resin), solvent and an imidazole derivative as curing accelerator.

SUMMARY OF THE INVENTION

The invention relates to a conductive metal composition which includes 40 to 88 wt % (weight-%) of silver particles having an average particle size in the range of 10 to 100 nm and having an aspect ratio of 3 to 1:1, 2 to 20 wt % of a poly(2-ethyl-2-oxazoline) resin having a weight-average molar mass of 50,000 to 500,000 and 10 to 58 wt % of a solvent for the poly(2-ethyl-2-oxazoline) resin.

DETAILED DESCRIPTION OF INVENTION

In the description and the claims the term "average particle size" is used. It shall mean the average primary particle size (mean particle diameter, d50) determined by means of laser light scattering. Laser light scattering measurements can be carried out making use of a particle size analyzer, for example, a Microtrac S3500 machine.

In the description and the claims the term "aspect ratio" is used with regard to the shape of the silver particles included in the conductive metal composition of the invention. It means the ratio of the largest dimension to the smallest dimension of a silver particle and it is determined by electron microscopy and evaluating the electron microscopical images by measuring the dimensions of a statistically meaningful number of individual silver particles.

In the description and the claims the term "weight-average molar mass" is used. It shall mean the weight-average molar mass as determined by gel permeation chromatography (GPC; divinylbenzene-cross-linked polystyrene as the immobile phase, tetrahydrofuran as the liquid phase, polystyrene standards).

With the conductive metal composition of the invention the applicant has found an improved conductive metal composition in terms of low resistivity and good adhesion of a conductive metallization applied therefrom on a substrate and cured by photonic sintering. Said low resistivity can be in the range of, for example, only 6 to 15 µΩ·cm.

The conductive metal composition of the invention includes 40 to 88 wt %, or, in an embodiment, 65 to 80 wt % of silver particles, based on total conductive metal composition. The silver particles may be uncoated or at least partially coated with a surfactant. The surfactant may be selected from, but is not limited to, stearic acid, palmitic acid, laurie acid, oleic acid, capric acid, myristic acid and linolic acid and salts thereof, for example, ammonium, sodium or potassium salts.

The silver particles have an average particle size in the range of 10 to 100 nm.

The silver particles exhibit an aspect ratio in the range of 3 to 1:1, or, in an embodiment, 2 to 1:1. Said aspect ratio shall express that the silver particles have a true spherical or essentially spherical shape as opposed to irregular silver particles like, for example, acicular silver particles (silver needles) or silver flakes (silver platelets). The individual silver particles when looked at under an electron microscope have a ball like or near-to-ball like shape, i.e., they may be perfectly round or almost round, elliptical or they may have an ovoid shape. The silver particles' surface may be uniform and it may exhibit a smooth radius of curvature.

Silver particles having an average particle size in the range of 10 to 100 nm and having an aspect ratio in the range of 3 to 1:1 are commercially available. An example of such commercially available silver particles is the product Silver Powder #7000-35 from FERRO.

The conductive metal composition of the invention includes 2 to 20 wt % or, in an embodiment, 5 to 15 wt % of a poly(2-ethyl-2-oxazoline) resin as a binder. The 2 to 20 wt % mean poly(2-ethyl-2-oxazoline) solids, based on total conductive metal composition.

The poly(2-ethyl-2-oxazoline) resin has a weight-average molar mass of 50,000 to 500,000 or, in an embodiment, of 50,000 to 200,000. If the weight-average molar mass is below 50,000, the viscosity of the conductive metal composition is too low and its application and spreading behavior might suffer; if it exceeds 500,000, the electrical conductivity of the applied and cured conductive metal composition might suffer and the viscosity of the conductive metal composition may be too high.

Poly(2-ethyl-2-oxazoline) resins having a weight-average molar mass in the range of 50,000 to 500,000 are commercially available. Examples of such commercially available poly(2-ethyl-2-oxazoline) resins are the products Aquazol® from Ashland.

The conductive metal composition of the invention includes 10 to 58 wt %, or, in an embodiment, 10 to 40 wt %, of a solvent for the poly(2-ethyl-2-oxazoline) resin. The solvent may be water, a mixture of water and one or more organic solvents, a single organic solvent or a mixture of two or more organic solvents which dissolves/dissolve the poly(2-ethyl-2-oxazoline) resin and which can evaporate from a metallization applied from the conductive metal composition of the invention before and/or while being cured by photonic sintering. Examples of suitable organic solvents include n-pentane, toluene, methyl ethyl ketone, methylene chloride, acetone, dials like ethylene glycol, propylene glycol, diethylene glycol, triethylene glycol and hexylene glycol, ethanol, methanol, or any combination thereof.

The conductive metal composition of the invention may or may not include at least one additive. Accordingly, the proportion of the at least one additive may be in the range of, for example, 0 to 2 wt %, based on total conductive metal composition. Examples of possible additives include defoamers, levelling agents and rheology control agents.

In an embodiment, the conductive metal composition of the invention consists of 40 to 88 wt % of silver particles having an average particle size in the range of 10 to 100 nm and having an aspect ratio of 3 to 1:1, 2 to 20 wt % of a poly(2-ethyl-2-oxazoline) resin having a weight-average molar mass of 50,000 to 500,000, 10 to 58 wt % of a solvent for the poly(2-ethyl-2-oxazoline) resin. and 0 to 2 wt % of at least one additive, wherein the sum of the wt% totals 100 wt %.

The conductive metal composition of the invention is a viscous composition, which may be prepared by mechanically mixing the silver particles with the poly(2-ethyl-2-oxazoline) resin, the solvent and the optional one or more additives. In an embodiment, it may be prepared by mechanically mixing the silver particles with a solution of the poly(2-ethyl-2-oxazoline) resin in the solvent. In an embodiment, the manufacturing method power mixing, a dispersion technique that is equivalent to the traditional roll milling, may be used: roll milling or other mixing technique can also be used. The possible one or more additives may be added at various stages of the mixing process, for example, before and/or during the mixing process.

The conductive metal composition of the invention may be used in the production of conductive metallizations on substrates. In an embodiment, the conductive metallization may serve as a conductive track. In another embodiment it may serve as a collector electrode. Therefore the invention relates also to such production process and to substrates provided with conductive metallizations made by said production process. Said production process includes the steps:

(1) providing a substrate,
(2) applying the conductive metal composition of the invention on the substrate, and
(3) subjecting the conductive metal composition applied in step (2) to photonic sintering to form the conductive metallization.

In step (1) of the process of the invention a substrate is provided. The substrate may be comprised of one or more than one material. The term "material" used herein in this context refers primarily to the bulk material or the bulk materials the substrate is comprised of. However, if the substrate is comprised of more than one material, the term "material" shall not be misunderstood to exclude materials present as a layer. Rather, substrates comprised of more than one material include substrates comprised of more than one bulk material without any thin layers as well as substrates comprised of one or more than one bulk material and provided with one or more than one thin layer. Examples of said layers include dielectric (electrically insulating) layers and active layers.

Examples of dielectric layers include layers of inorganic dielectric materials like silicon dioxide, zirconia-based materials, alumina, silicon nitride, aluminum nitride and hafnium oxide; and organic dielectric materials, e.g. fluorinated polymers like PTFE, polyesters and polyimides.

The term "active layer" is used in the description and the claims. It shall mean a layer selected from the group including photoactive layers, light-emissive layers, semiconductive layers and non-metallic conductive layers. In an embodiment, it shall mean layers selected from the group consisting of photoactive layers, light-emissive layers, semiconductive layers and non-metallic conductive layers.

For the purpose of the present disclosure, the term "photoactive" used herein shall refer to the property of converting radiant energy (e.g., light) into electric energy.

Examples of photoactive layers include layers based on or including materials like copper indium gallium diselenide, cadmium telluride, cadmium sulphide, copper zinc tin sulphide, amorphous silicon, organic photoactive compounds or dye-sensitized photoactive compositions.

Examples of light-emissive layers include layers based on or including materials like polyp-phenylene vinylene), tris(8-hydroxyquinolinato)aluminum or polyfluorene (derivatives).

Examples of semiconductive layers include layers based on or including materials like copper indium gallium diselenide, cadmium telluride, cadmium sulphide, copper zinc tin sulphide, amorphous silicon or organic semiconductive compounds.

Examples of non-metallic conductive layers include layers based on or including organic conductive materials like polyaniline, PEDOT:PSS (poly-3,4-ethylenedioxythiophene polystyrenesulfonate), polythiophene or polydiacetylene; or based on or including transparent conductive materials like indium tin oxide (ITO), aluminum-doped zinc oxide, fluorine-doped tin oxide, graphene or carbon nanotubes.

In an embodiment, the substrate is a temperature-sensitive substrate. This means that the material or one or more of the materials the substrate is comprised of are temperature-sensitive. For the avoidance of doubt, this includes such cases, where the substrate includes at least one of the aforementioned layers wherein the layer or one, more or all layers are temperature-sensitive.

The term "temperature-sensitive" as opposed to "temperature-resistant" is used herein with reference to a substrate, a substrate material (=the or one of the bulk materials a substrate is comprised of) or a layer of a substrate and its behavior when exposed to heat. Hence, "temperature-sensitive" is used with reference to a substrate, a substrate material or a layer of a substrate which does not withstand a high object peak temperature of >130° C. or, in other words, which undergoes an unwanted chemical and/or physical alteration at a high object peak temperature of >130° C. Examples of such unwanted alteration phenomena include degradation, decomposition, chemical conversion, oxidation, phase transition, melting, change of structure, deformation and combinations thereof. Object peak temperatures of >130° C. occur for example during a conventional drying or firing process as is typically used in the manufacture of metallizations applied from metal pastes containing conventional polymeric resin binders or glass binders.

Accordingly, the term "temperature-resistant" is used herein with reference to a substrate, a substrate material or a layer of a substrate which withstands an object peak temperature of >130° C.

A first group of examples of substrate materials includes organic polymers. Organic polymers may be temperature-sensitive. Examples of suitable organic polymer materials include PET (polyethylene terephthalate), PEN (polyethylene napthalate), PP (polypropylene), PC (polycarbonate) and polyimide.

A second group of examples of substrate materials includes materials other than an organic polymer, in particular, inorganic non-metallic materials and metals. Inorganic non-metallic materials and metals are typically temperature-resistant. Examples of inorganic non-metallic materials include inorganic semiconductor materials like monocrystalline silicon, polycrystalline silicon, silicon carbide; and inorganic dielectric materials like glass, quartz, zirconia-based materials, alumina, silicon nitride and aluminum nitride. Examples of metals include aluminum, copper and steel.

The substrates may take various forms, examples of which include the form of a film, the form of a foil, the form of a sheet, the form of a panel and the form of a wafer.

In step (2) of the process of the invention the conductive metal composition is applied on the substrate. In case the substrate is provided with at least one of the aforementioned layers, the conductive metal composition may be applied on such layer, The conductive metal composition may be applied to a dry film thickness of, for example, 0.1 to 100 μm. The method of conductive metal composition application may be printing, for example, flexographic printing, gravure printing, ink-jet printing, offset printing, screen printing, nozzle/extrusion printing, aerosol jet printing, or it may be pen-writing. The variety of application methods enables the conductive metal composition to be applied to cover the entire surface or only one or more portions of the substrate. It is possible for example to apply the conductive metal composition in a pattern, wherein the pattern may include fine structures like dots or thin lines with a dry line width as low as, for example, 10 or 20 μm.

After its application on the substrate the conductive metal composition may be dried in an extra process step prior to performing step (3) or it may directly (i.e., without deliberate delay and without undergoing an especially designed drying step) be subject to the photonic sintering step (3). Such extra drying step will typically mean mild drying conditions at a low object peak temperature in the range of 50 to ≤130° C.

The term "object peak temperature" used herein in the context of said optional drying means the substrate peak temperature reached during drying of a conductive metallization applied from the conductive metal composition of the invention onto the substrate.

The primary target of said optional drying is the removal of solvent; however, it may also support the densification of the metallization matrix. The optional drying may be performed, for example, for a period of 1 to 60 minutes at an object peak temperature in the range of 50 to 130° C., or, in an embodiment, 80 to ≤130° C. The skilled person will select the object peak temperature considering the thermal stability of the poly(2-ethyl-2-oxazoline) resin and of the substrate provided in step (1) and the type of solvent included in the conductive metal composition of the invention.

The optional drying can be carried out making use of, for example, a belt, rotary or stationary dryer, or a box oven. The heat may be applied by convection and/or making use of IR (infrared) radiation. The drying may be supported by air blowing.

Alternatively, the optional drying may be performed using a method which induces a higher local temperature in the metallization than in the substrate as a whole, i.e. in such case the object peak temperature of the substrate may be as low as room temperature during drying. Examples of such drying methods include photonic heating (heating via absorption of high-intensity light), microwave heating and inductive heating.

In step (3) of the process of the invention the conductive metal composition applied in step (2) and optionally dried in the aforementioned extra drying step is subjected to photonic sintering to form the conductive metallization.

Photonic sintering which may also be referred to as photonic curing uses light, or, to be more precise, high-intensity light to provide high-temperature sintering. The light has a wavelength in the range of, for example, 240 to 1000 nm. Typically, flash lamps are used to provide the source of light and are operated with a short on time of high power and a duty cycle ranging from a few hertz to tens of hertz. Each individual flashlight pulse may have a duration in the range of, for example, 100 to 2000 microseconds and an intensity in the range of, for example, 30 to 2000 Joules. The flashlight pulse duration may be adjustable in increments of, for example, 5 microseconds. The dose of each individual flashlight pulse may be in the range of, for example, 4 to 15 Joule/cm$^2$.

The entire photonic sintering step (3) is brief and it includes only a small number of flashlight pulses, for example, up to 5 flashlight pulses, or, in an embodiment, 1 or 2 flashlight pulses. It has been found that the conductive metal composition of the invention, unlike known prior art conductive metal compositions, enables the photonic sintering step (3) to be performed in an unusually short period of time of, for example, ≤1 second, e.g. 0.1 to 1 seconds, or, in an embodiment, ≤0.15 seconds, e.g. 0.1 to 0.15 seconds; i.e. the entire photonic sintering step (3) commencing with the first flashlight pulse and ending with the last flashlight pulse can be as short as, for example, ≤1 second, e.g. 0.1 to 1 seconds, or, in an embodiment, ≤0.15 seconds, e.g. 0.1 to 0.15 seconds.

The metallized substrate obtained after conclusion of step (3) of the process of the invention may represent an electronic device, for example, a printed electronic device. However, it is also possible that it forms only a part of or an intermediate in the production of an electronic device. Examples of said electronic devices include RFID (radio frequency identification) devices; PV (photovoltaic) or OPV (organic photovoltaic) devices, in particular solar cells; light-emissive devices, for example, displays, LEDs (light emitting diodes), OLEDs (organic light emitting diodes); smart packaging devices; and touchscreen devices. In case the metallized substrate forms only said part or intermediate it is further processed. One example of said further processing may be encapsulation of the metallized substrate to protect it from environmental Another example of said further processing may be providing the metallization with one or more of the aforementioned dielectric or active layers, wherein in case of an active layer direct or indirect electrical contact is made between metallization and active layer. A still further example of said further processing is electroplating or light-induced electroplating of the metallization which then serves as a seed metallization.

What is claimed is:

1. An electrically conductive metal composition comprising 40 to 88 wt % of the total composition of silver particles having an average particle size in the range of 10 to 100 nm and having an aspect ratio of 3 to 1:1, 2 to 20 wt % of the total composition of a poly(2-ethyl-2-oxazoline) resin having a weight-average molar mass of 50,000 to 500,000 and 10 to 58 wt % of the total composition of a solvent for the poly(2-ethyl-2-oxazoline) resin.

2. The conductive metal composition of claim 1, wherein the silver particles are 65 to 80 wt % of the total composition.

3. The conductive metal composition of claim 1, wherein the poly(2-ethyl-2-oxazoline) resin is 5 to 15 wt % of the total composition.

4. The conductive metal composition of claim 1, wherein the poly(2-ethyl-2-oxazoline) resin has a weight-average molar mass of 50,000 to 200,000.

5. The conductive metal composition of claim 1, wherein the solvent is 10 to 40 wt % of the total composition.

6. The conductive metal composition of claim 1, wherein the solvent is selected from the group consisting of water, a mixture of water and one or more organic solvents, a single organic solvent and a mixture of two or more organic solvents.

7. The conductive metal composition of claim 1 comprising one or more additives.

8. The conductive metal composition of claim 1 consisting of 40 to 88 wt % of the total composition of silver particles having an average particle size in the range of 10 to 100 nm and having an aspect ratio of 3 to 1:1, 2 to 20 wt % of the total composition of a poly(2-ethyl-2-oxazoline) resin having a weight-average molar mass of 50.000 to 500.000, 10 to 58 wt % of the total composition of a solvent for the poly(2-ethyl-2-oxazoline) resin, and 0 to 2 wt % of the total composition of at least one additive, wherein the sum of the wt % totals 100 wt %.

9. A process for the production of a conductive metallization on a substrate comprising the steps:
(1) providing a substrate,
(2) applying a conductive metal composition of claim 1 on the substrate, and
(3) subjecting the conductive metal composition applied in step (2) to photonic sintering to form a conductive metallization on the substrate.

10. The process of claim 9, wherein the substrate comprises one or more than one material.

11. The process of claim 9, wherein the substrate is a temperature-sensitive substrate.

12. The process of claim 9, wherein the conductive metal composition is applied by printing or pen-writing.

13. The process of claims 9, wherein the applied conductive metal composition is dried prior to performing step (3).

14. The process of claim 9, wherein step (3) is performed within ≤1 second.

\* \* \* \* \*